United States Patent [19]

Davey et al.

[11] Patent Number: 5,065,928
[45] Date of Patent: Nov. 19, 1991

[54] METHOD AND APPARATUS FOR BLOWING AN OPTICAL FIBRE MEMBER

[75] Inventors: Rodney J. Davey, Rainhill; Graham R. Handley, Upton; Alfred J. Ward-Smith, Bracknell, all of England

[73] Assignees: BICC plc., London; Corning Limited, Sunderland, both of England

[21] Appl. No.: 274,752

[22] Filed: Nov. 22, 1988

[30] Foreign Application Priority Data

Nov. 25, 1987 [GB] United Kingdom ............... 8727580

[51] Int. Cl.⁵ ......................................... B65H 54/78
[52] U.S. Cl. ......................................... 226/7; 226/97
[58] Field of Search ............... 226/97, 7; 28/250, 255, 28/264

[56] References Cited

U.S. PATENT DOCUMENTS

| 3,433,424 | 3/1969 | Rover et al. | 242/47 |
| 3,645,431 | 2/1972 | Harrison | 226/97 |
| 3,754,694 | 8/1973 | Reba | 226/97 |
| 3,970,231 | 7/1976 | Strutz et al. | 226/7 |
| 4,024,698 | 5/1977 | Weiss et al. | 226/97 X |
| 4,119,253 | 10/1978 | Benson | 226/97 X |
| 4,332,436 | 6/1982 | Adorni et al. | 350/96.23 |
| 4,399,597 | 8/1983 | Rogers, Jr. | 28/250 |
| 4,640,576 | 2/1987 | Eastwood et al. | 350/96.23 |
| 4,850,569 | 7/1989 | Griffioen et al. | 254/134.4 |

FOREIGN PATENT DOCUMENTS

| 0001988 | 11/1979 | European Pat. Off. . |
| 0108590 | 5/1984 | European Pat. Off. . |
| 0287225 | 10/1988 | European Pat. Off. . |
| 40-9353 | 5/1965 | Japan . |
| 1526777 | 9/1978 | United Kingdom . |
| 2005216 | 4/1979 | United Kingdom . |
| 2081764 | 2/1982 | United Kingdom . |
| 2169722 | 7/1986 | United Kingdom . |
| 2179471 | 3/1987 | United Kingdom . |

Primary Examiner—Daniel P. Stodola
Assistant Examiner—P. Bowen
Attorney, Agent, or Firm—Darby & Darby

[57] ABSTRACT

A method is described for introducing one or more optical fibre members (1) into a tubular passageway (2). The method involves passing a current of fluid, preferably air, into and through a venturi (6) the downstream side of which communicates with the passageway (2). The optical fibre member (1) is introduced into the venturi (6) via a hypodermic tube (7) and then into the passageway (2). Apparatus for carrying out the method are described.

27 Claims, 7 Drawing Sheets

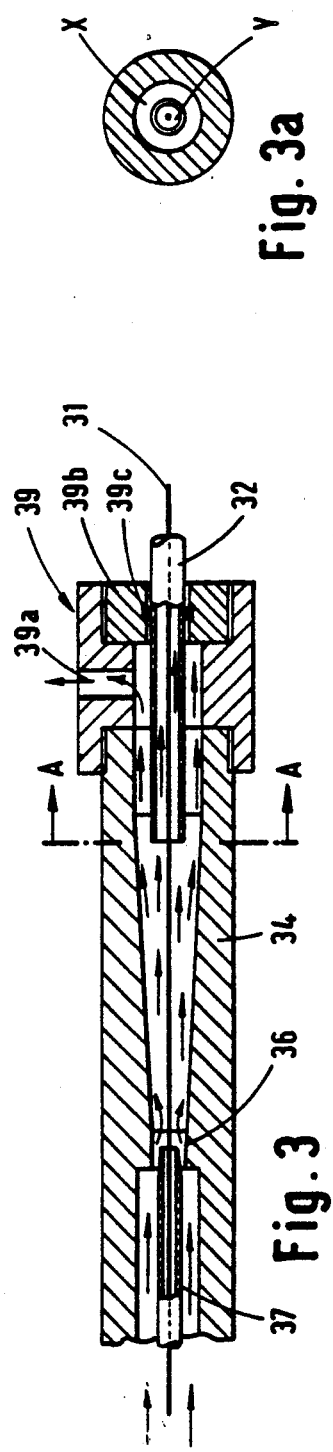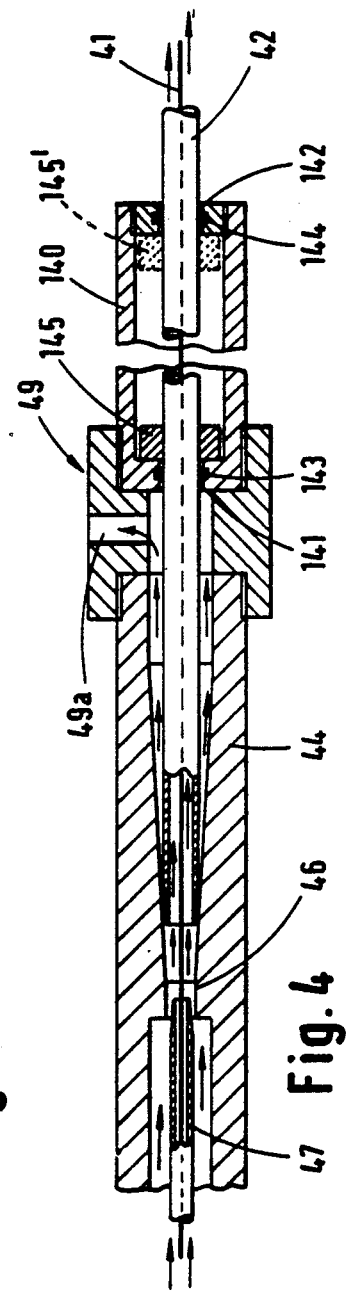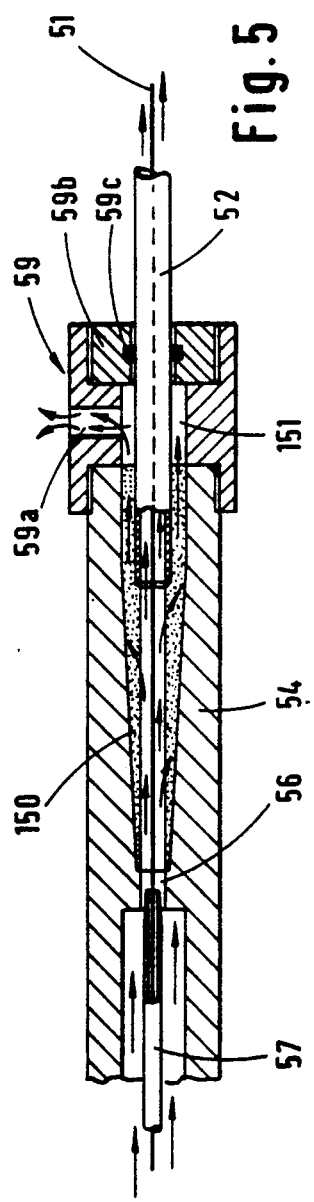

METHOD AND APPARATUS FOR BLOWING AN OPTICAL FIBRE MEMBER

BACKGROUND OF THE INVENTION

1. Field of the Invention

This invention relates to a method and apparatus for blowing an optical fibre member.

2. Description of Related Art

A method is known from EP-A-108590 for installing an optical fibre member in a tubular passageway using a flow of air which travels along the tubular passageway in the desired direction of travel of the optical fibre member. For this purpose the optical fibre member comprises an outer sheath surrounding one or more optical fibres, the sheath being of low density so as to facilitate movement of the fibre member by the flow of air. One feature of the method and apparatus described in EP-A-108590 is that the optical fibre member is introduced into the tubular passageway through a pressurised blowing head via a seal, which must both allow the fibre member to pass through freely and must minimize the escape of air. To introduce the optical fibre member it passes between a pair of drive wheels located within the blowing head. The drive wheels engage the optical fibre member in the nip between the wheels and impart a longitudinal force to the optical fibre member in the direction of introduction An object of the present invention is to provide a method and apparatus for introducing one or more optical fibre members into a tubular passageway which avoids the need for such drive wheels, avoids the need for a seal around the fibre where it enters the head and avoids viscous drag opposed to the direction of motion, downstream of the wheels. The avoidance of drive wheels is particularly advantageous in the case of optical fibre members which have only a single optical fibre in a flexible sheath, since such members may be so lacking in rigidity that applying an effective longitudinal force to them by means of drive wheels is difficult.

SUMMARY OF THE INVENTION

According to the present invention there is provided a method of introducing at least one optical fibre member into a tubular passageway, which comprises passing a current of fluid, preferably air, into and through a venturi the downstream side of which communicates with the said passageway, and introducing the optical fibre member into the venturi and thence into the said passageway.

Among the benefits of using devices which derive force from the viscous drag of air over the entire surface of the fibre member, are that the force is low and uniform and is maintained regardless of speed of the member. Thus the mechanism is tolerant of changes of speed and only operates at low stress in either tension or compression.

The present invention further provides an apparatus for introducing at least one optical fibre member into a tubular passageway, which comprises means defining a venturi the downstream side of which communicates, in use, with the said passageway, means for passing a current of fluid, preferably air, into and through the venturi, and means for introducing the optical fibre member into the venturi and thence into the said passageway.

BRIEF DESCRIPTION OF THE DRAWINGS

In the accompanying drawings:

FIGS. 3 to 13 are longitudinal sections through eleven further embodiments, with FIGS. 3a, 7a, 9a, 10a, 11a, 12a and 13a each being cross sections on a line A—A drawn in a respective one of FIGS. 3, 7 and 9 to 13, and FIG. 10b being a cross section corresponding to FIG. 10a but through an alternative arrangement.

Figure 1:
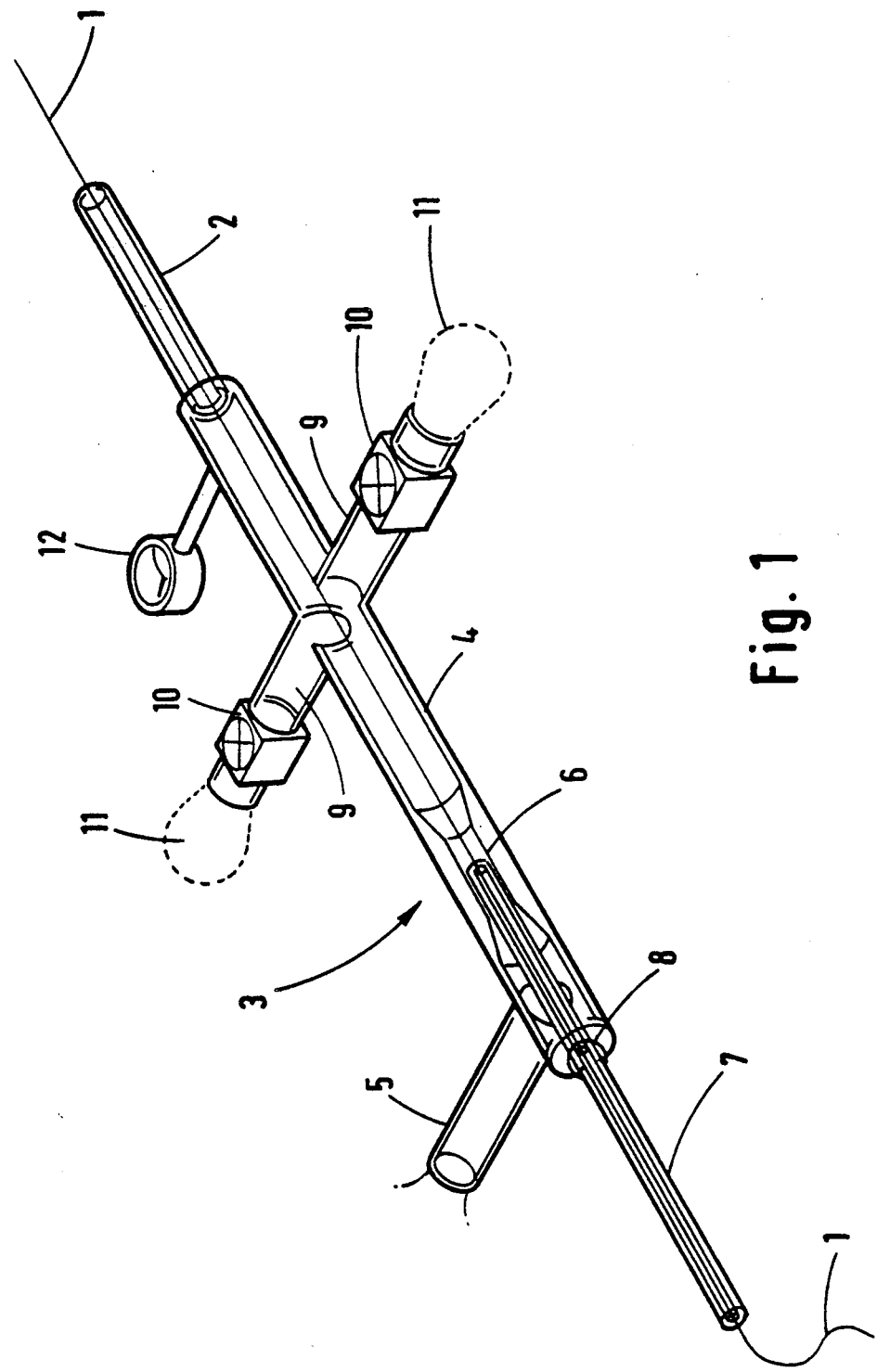
FIG. 1 is a diagrammatic perspective view of a first embodiment.

The illustrated apparatus is shown being used to introduce an optical fibre member 1 into a tubular passageway 2 of which only a portion is shown. The apparatus according to the invention for introducing the optical fibre member 1 into the passageway 2 is denoted generally by reference numeral 3 and is referred to herein as a blowing head. The blowing head 3 comprises an elongate tube 4 the downstream end of which communicates with the passageway 2. Adjacent its upstream end, the tube 4 has a side arm 5 to which is connected a source of gas under pressure, preferably a source of compressed air. Such a source can be of any conventional type. The tube 4 is constricted on the downstream side of the side arm 5 to define a venturi 6. A tube 7 which has a narrow bore and which is referred to herein as a hypodermic tube, extends into the tube 4 so that the downstream end thereof is situated in the venturi 6. The longitudinal position of the hypodermic tube 7 can be adjusted with respect to the venturi 6 by means of a collet chuck 8, so that the downstream end of the hypodermic tube 7 can be located at the zone of minimum pressure.

Downstream of the venturi 6 a pair of vent tubes 9 communicate with the tube 4, one on either side thereof. Each vent tube 9 communicates with atmosphere via a control valve 10 which allows a controlled, adjustable amount of air to pass from the vent tube to atmosphere. The end of each vent tube remote from its connection to the tube 4 communicates with a noise suppressor 11, which is a chamber designed to absorb noise generated by the flow of high pressure air venting to atmosphere. Other forms of venting can be used instead of the pair of vent tubes, and some of these other forms of venting are shown in the embodiments of FIG. 3 to 7 and 11 to 13 which are described below. The illustrated apparatus also comprises a pressure gauge 12 which serves to monitor the pressure within the tube 4.

In operation, air of low moisture content is introduced into the side arm 5 at high pressure, for example 100 psig and flows at high velocity through the venturi 6. The venturi exploits the properties of a gas flow passing through a constriction. Within the constriction the axial pressure distribution exhibits a minimum. The dimensions of the venturi, the values of the supply pressure and the mass flow rate of air are selected so that the minimum pressure is below atmospheric pressure. In the majority of practical embodiments of the venturi the velocity of the air flow in the constriction will reach the speed of sound. In some embodiments the flow throughout the venturi will remain entirely subsonic. In either case this produces a steep rising pressure gradient, accompanied throughout by continued forward flow over a short region within the tube 4. The flow of air into the hypodermic tube 7 which results from atmospheric pressure at its upstream end and the sub-atmospheric pressure at its downstream end assists in moving the optical fibre member through the tube 7, through the tube 4 with its pressure gradient region, and thence into the passageway 2. On the downstream side of the pressure gradient region, viscous drag on the optical fibre member increases considerably due to the high velocity in this region, thus assisting in injecting the fibre member into the passageway 2. In this way the optical fibre member is transported into the passageway 2, and the force developed in the blowing head 3 continues to assist the forward motion of the fibre as it progresses through the passageway 2. Depending on the length and diameter of the passageway 2 the conditions within the tube 4 will need to be varied to achieve optimum performance. The air inlet pressure and valves 10 control the mass flow of air through the blowing head, so as to maintain appropriate viscous drag on the optical fibre member and appropriate pressures at the inlet to passageway 2 and at the downstream end of the hypodermic tube 7.

It will be appreciated, however, that venting a large proportion of the air, although beneficial in terms of mass flow rate and therefore venturi action, is wasteful in terms of power consumed. If power consumption is of overriding importance, it becomes desirable to reduce the amount of air vented and, most desirably of all, to eliminate altogether the need for the venting. It is possible to avoid the need for venting by very tight control of venturi dimensions and geometry. However, the use of vents allows some relaxation of these parameters. Bearing in mind the need to produce an air flow through the venturi 6 at a velocity sufficient to create a zone at subatmospheric pressure at the downstream end of the hypodermic tube, an alternative approach is for the upstream end of the hypodermic tube to be at a pressure above atmospheric. The requirement for venting can then be relaxed provided that the flow of air through the venturi is still sufficient to reduce the pressure at the downstream end of the hypodermic tube to a level below that at the upstream end. One way of achieving this is to have the complete length of optical fibre member which is to be introduced stored in a pressurised vessel. This is described in our copending application filed on even date herewith and having the same title as the present application. Another way is to arrange two or more venturi blowing heads in series.

A number of other modifications are also possible to the embodiment described. For example, the tube 4 may be provided with a plurality of venturis into each of which a respective hypodermic tube passes, or a single venturi may be provided with a plurality of hypodermic tubes to optimise venturi performance. Another modification is to provide a venturi of variable geometry. One simple way of achieving this would be to replace the cylindrical cross-section which is shown for the main portion of the venturi 6 by a cross-section which tapers from one end to the other. The tapering could be achieved by suitable choice of the profile of the venturi wall and/or by shaping the tip of the hypodermic tube. Adjusting the longitudinal position of the downstream end of the hypodermic tube 7 would then have the effect of varying the annular gap defined between the outer surface of the downstream end of the hypodermic tube 7 and the inner surface of the venturi 6. This in turn would have the effect of varying the extent of the venturi effect produced.

One other possible modification is to make the hypodermic tube and the venturi throat integral with one another, for example machine them from a single block of metal, ceramic or other suitable material. The material preferably has a low coefficient of thermal expansion. In this case the annular space between the hypodermic tube and the venturi throat might be replaced by a series of holes defining passages which extend generally parallel to the hypodermic tube. Means could be provided selectively to block off some of the holes so as to provide variability in the venturi effect. On advantage of having the hypodermic tube and venturi throat integral with one another is that the robustness of the unit could thereby be increased. Another advantage is that by arranging the holes symmetrically about the hypodermic tube the symmetry of the unit, and hence of the air flow produced, can be increased.

If desired, mechanical vibration may be imparted to the upstream end of the passageway 2 or to the hypodermic tube or to the fibre member, to assist in moving the optical fibre member. Also the air flow may be pulsed, for the same reason.

Further embodiments of the invention, which incorporate yet other modifications, are shown in FIGS. 3 to 13 of the accompanying drawings.

The embodiment of FIGS. 3 and 3a comprises an elongate tube 34 a hypodermic tube 37 extending into the tube 34, a venturi 36 defined within the tube 34 and a vent arrangement 39. The embodiment serves to transport an optical fibre member 31 into a tubular passageway 32. The vent arrangement 39 has an air outlet 39a, and a collar 39b with an O-ring 39c which makes an air-tight seal with the passageway 32. It will be seen that the upstream end of the passageway 32 is located upstream of the air outlet 39a. This has the result that the effect of the air being vented on the fibre member 31, prior to its entering the passageway 32, is more uniform and there is less tendency than there is in the embodiment of FIGS. 1 and 2 for the fibre member to be drawn to the side wall of the tube 4. In FIG. 3a, the cross-sectional area of the passageway 32 is denoted by Y, and the cross-sectional area of the annular region between the passageway 32 and the tube 34 is denoted by X. It is preferred that the value of X/Y should be greater than, or equal to, the volumetric flow rate of venting air passing through the space X divided by the volumetric flow rate of air entering the passageway 32. This ensures that the velocity of the air entering the passageway 32 is at least as great as the velocity of the air passing around the passageway 32 ti be vented, and helps to keep the optical fibre member on the correct course.

One problem with the embodiment of FIGS. 3 and 3a is that it is difficult to thread the leading end of the optical fibre member into the upstream end of the passageway 32. The embodiment of FIG. 4 provides a way of overcoming this problem. This embodiment comprises an elongate tube 44, a venturi 46, a hypodermic tube 47 and a venting arrangement 49, and serves to introduce an optical fibre member 41 into a tubular passageway 42. The venting arrangement 49 has an air outlet 49a. A cylindrical chamber 140 is secured to the venting arrangement 49 at the downstream end thereof. The tubular passageway 42 extends into and through the chamber 140 via openings 141 and 142 which are sealed with respective seals 143 and 144. The passageway 42 has a guide ring 145 secured to its outer surface. The tubular passageway 42 can be slid backwards and forwards within the chamber 140, within the limits defined by the end positions of the guide ring 145. The position illustrated in FIG. 4 is the threading position, with the guide ring 145 at the left hand end and the downstream end of the passageway 42 very close to the upstream end of the hypodermic tube 47. With the system in this position the optical fibre member can easily be threaded into the tubular passageway. Once threading has taken place the passageway 42 is moved rightwardly so that the guide ring 145 occupies the right hand position which is shown in broken lines in FIG. 4 and denoted as 145'. This is the operational position, and in this position venting can take place on the desired scale through the air outlet 49a. When the embodiment is in the threading position the air supply is not on.

FIG. 5 shows an alternative way of improving the uniformity of the venting. The embodiment comprises an elongate tube 54, a venturi 56, a hypodermic tube 57 and a venting arrangement 59, and the embodiment serves to introduce an optical fibre member 51 into a tubular passageway 52. The venting arrangement 59 comprises an air outlet 59a, and a collar 59b sealed to the passageway 52 by an O-ring 59c. The arrangement 59 further comprises a tubular member 150 which lines the outwardly diverging portion of the interior of the tube 54 and extends into the annular space defined between the tube 54 and the downstream end portion of the passageway 52. The internal surface of the tubular member 150 is such that a continuous cylindrical bore of constant cross-section is presented to fibre member moving through it.

The tubular member 150 is made of an air-permeable material such as a sintered ceramic material. This enables air to pass outwardly through the tubular member 150 into a cylindrical chamber 151 which is defined within the venting arrangement 59 and which communicates with the air outlet 59a.

Figure 6:
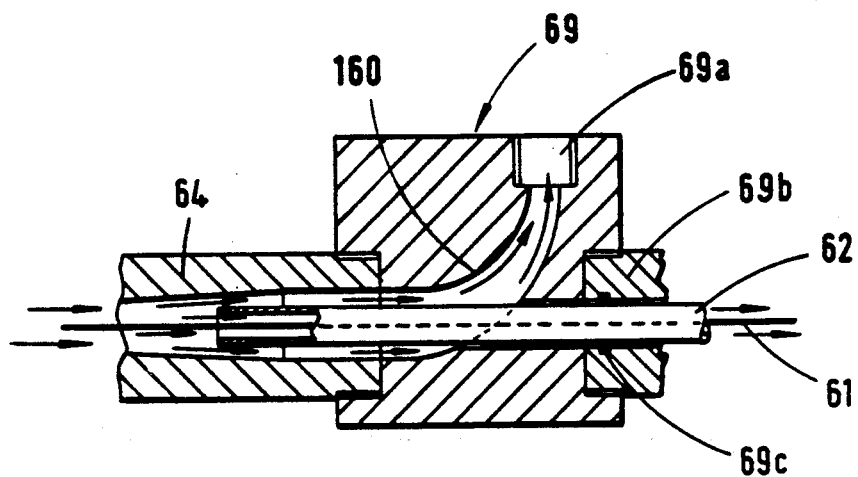

FIG. 6 shows the venting arrangement 69 of a further embodiment, and adjacent portions of that embodiment. The embodiment includes an elongate tube 64 and serves to introduce an optical fibre member 61 into a tubular passageway 62. The venting arrangement 69 has a collar 69b sealed to the tubular passageway 62 by an O-ring 69c. The arrangement 69 is distinguished from the venting arrangement shown in the preceding embodiments by the fact that its air inlet 69a communicates with the downstream end of the elongate tube 64 via a bore 160 which follows a curved path and which tapers from the upstream to the downstream ends thereof. The aim of this is to increase the uniformity with which air to be vented enters the annular space between the upstream end of the passageway 62 and the downstream end of the elongate tube 64.

Figure 7:
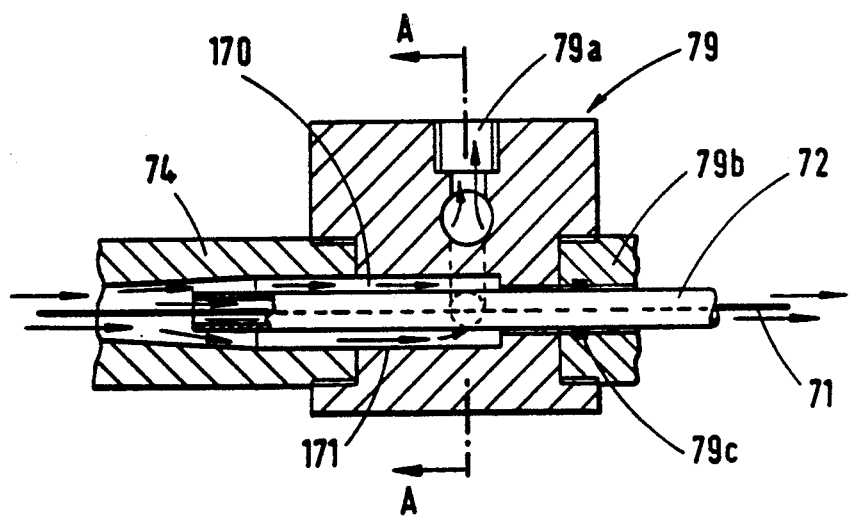
Figure 7A:
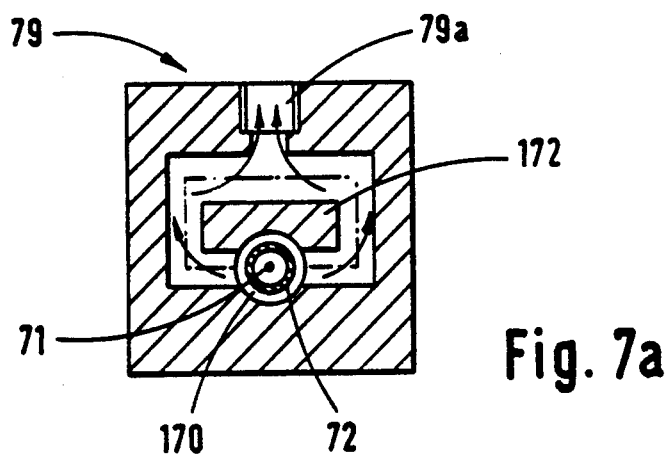

The approach to venting in the embodiment of FIGS. 7 and 7a is somewhat similar to that used in the embodiment of FIG. 6. The embodiment of FIG. 7 includes an elongate tube 74 and a venting arrangement 79, and serves to introduce an optical fibre member 71 into a tubular passageway 72. The arrangement 79 includes an air outlet 79a, and a collar 79b sealed to the passageway 72 by an O-ring 79c.

Air to be vented passes from the elongate tube 74 through an annular region 170 defined between the downstream end of the tubular passageway 72 and a cylindrical bore 171 formed in the venting arrangement 79. From there the air flows around either side of an obstacle 172, so that the air is forced to follow a somewhat tortuous path before reaching the air outlet 79a, with the aim of improving the uniformity of the venting air flow.

Figure 8:
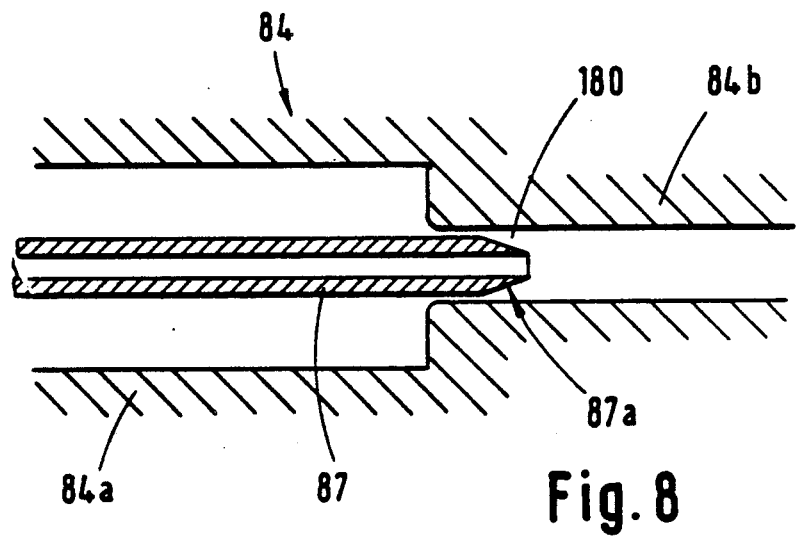

In the embodiments described above the venturis, where shown, are formed by having a hypodermic tube of at least approximately uniform external diameter opening into a surrounding tube whose cross-section increases as considered in a downstream direction. An alternative approach to the creation of a venturi is shown in FIG. 8. Here there is an elongate tube 84 corresponding in function to the tube 4 of FIGS. 1 and 2, which has an inlet portion 84a of larger internal diameter and an outlet portion 84b of smaller internal diameter. A hypodermic tube 87, through which the optical fibre member (not shown) travels passes through the inlet portion and terminates shortly after its entry into the outlet portion 84b. The end portion 87a of the hypodermic tube 87 is tapered so as to define between it and the adjacent wall of the tube portion 84b a region 180 whose cross-section increases as considered in a downstream direction. This provides a venturi.

Figure 9:
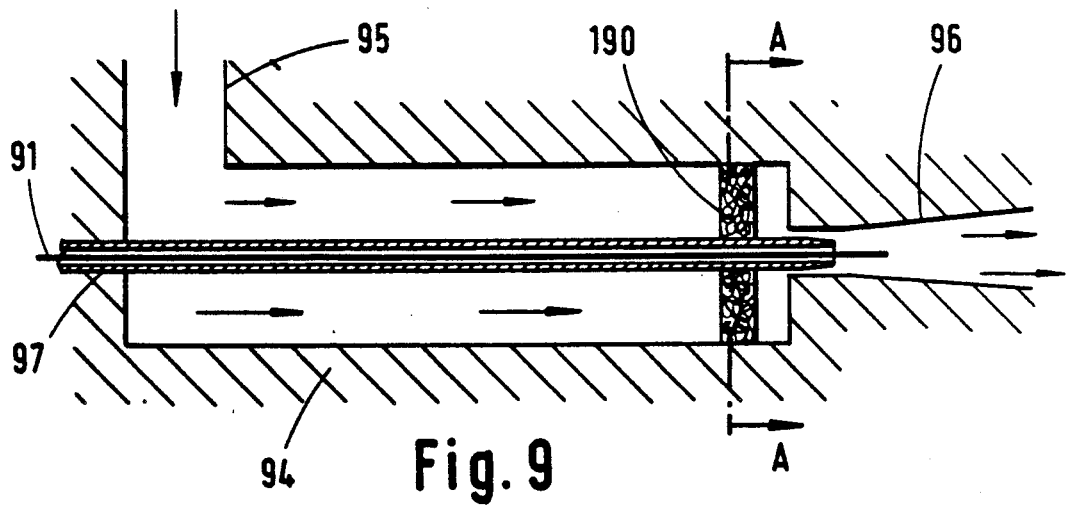
Figure 9A:
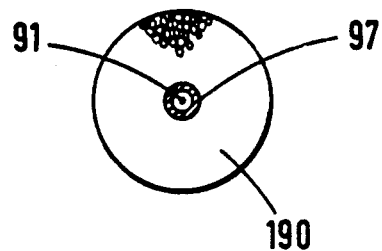

Uniformity of air flow is important not only in the region of the elongate tube where venting takes place but also in the region where air enters the elongate tube. The arrangement shown in FIGS. 1 and 2, using a simple side arm 5, can give rise to a non-uniform air flow, for example one which swirls around the interior of the elongate tube. FIGS. 9 and 10 show ways of overcoming or mitigating this effect, and will now be described FIG. 9 shows an air inlet 95 leading into an elongate tube 94. A hypodermic tube 97 extends into the elongate tube 94 and terminates in a venturi 96. Immediately upstream of the venturi the hypodermic tube 97 passes through an air-permeable disc 190, which is also shown in FIG. 9a. This can conveniently be made of a sintered ceramic material. The effect of this disc is to render the air flow more uniform in the region where the optical fibre member 91 passes through it. In effect, the disc 190 acts as a flow straightener.

Figure 10A:
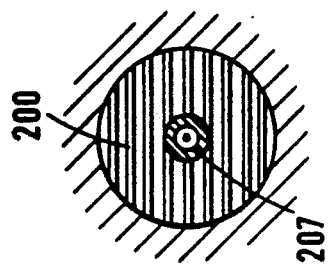
Figure 10B:
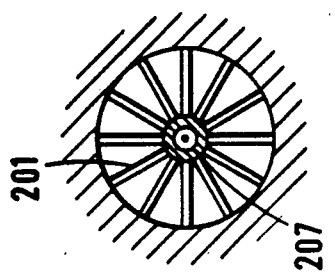
Figure 10:
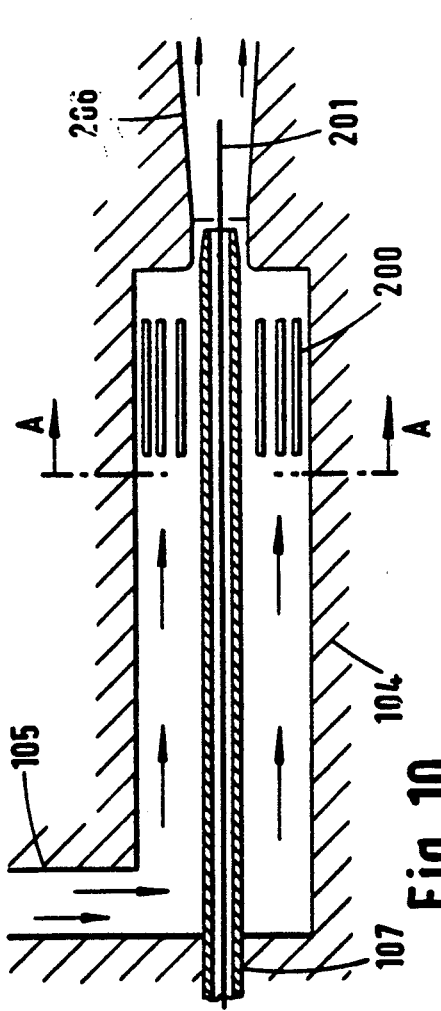

In the embodiment of FIG. 10 and FIG. 10a reference numerals are used which correspond to those of FIG. 9 except for being increased by 10. The embodiment of FIGS. 10 and 10a differs from that of FIGS. 9 and 9a in that the disc 190 is replaced by an array of baffles 200 which extend parallel to one another across the tube 104. As an alternative to the array of parallel baffles 200 an array of radial baffles 201 may be used, as shown in FIG. 10b.

Figure 11A:
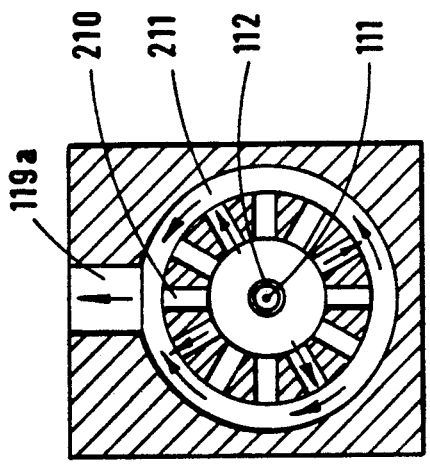
Figure 11:
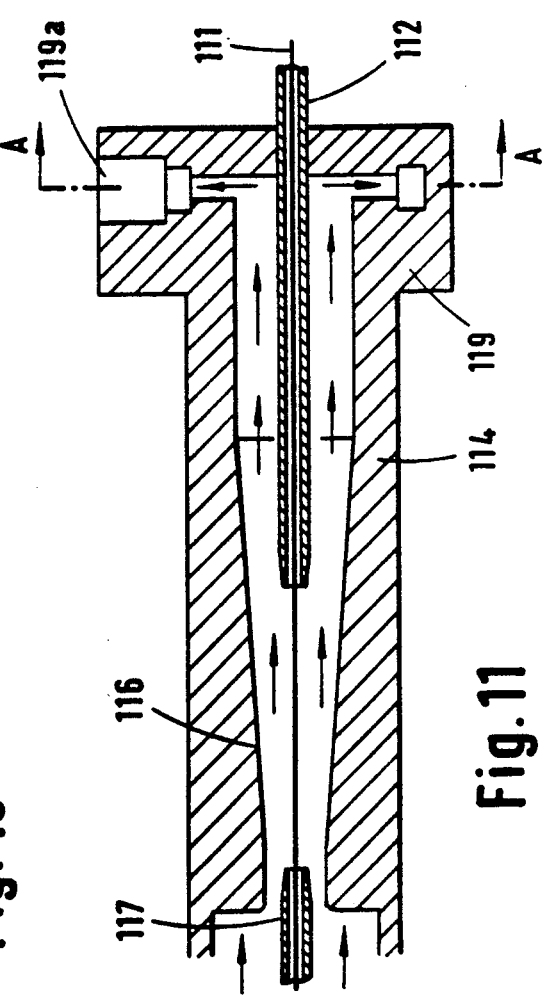
Figure 12A:
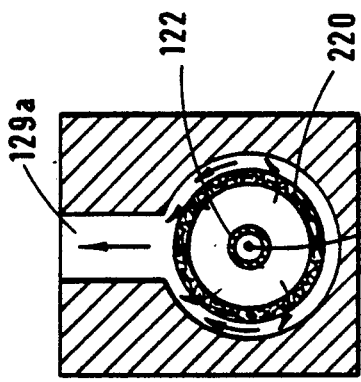
Figure 13A:
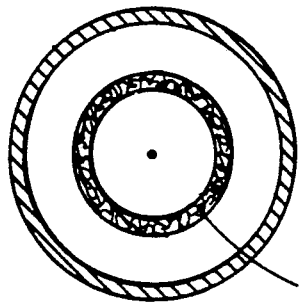
Figure 12:
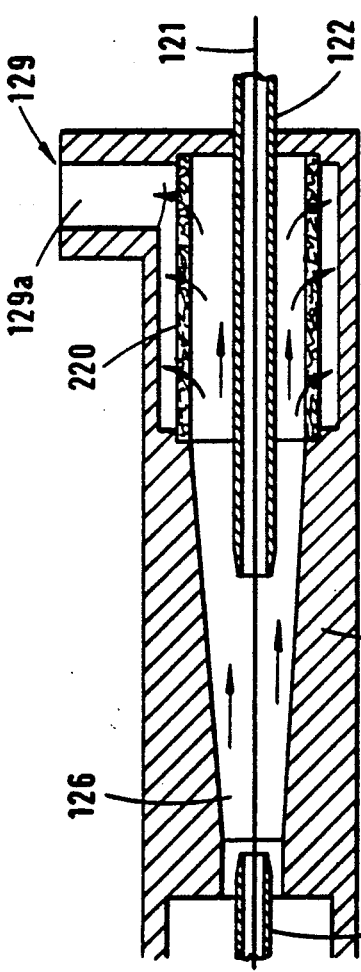
Figure 13:
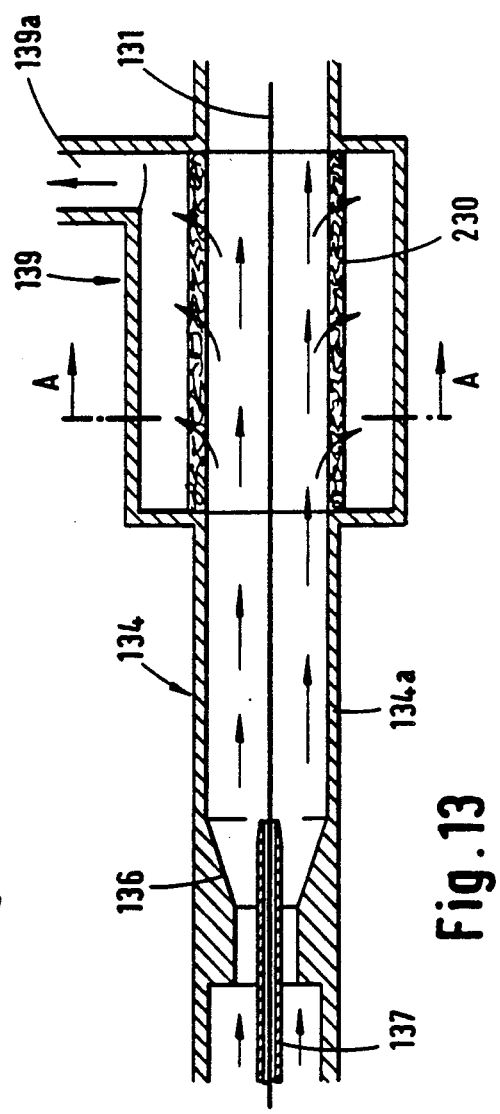

FIGS. 11, 12 and 13 show various alternatives to the arrangements of FIGS. 3 to 7 for improving the uniformity of venting. These embodiments will now be described.

The embodiment of FIGS. 11 and 11a comprises an elongate tube 114, a hypodermic tube 117, a venturi 116 and a venting arrangement 119. The embodiment serves to introduce an optical fibre member 111 into a tubular passageway 112. The venting arrangement 119 comprises an array of radially extending bores 210 disposed equidistantly from one another about the tubular passageway 112. The radial bores communicate with an annular chamber 211 which, in turn, communicates with an air outlet 119a.

The embodiment shown in FIG. 12 comprises an elongate tube 124, a hypodermic tube 127, a venturi 126 and a venting arrangement 129. The embodiment serves to introduce an optical fibre member 121 into a tubular passageway 122. The venting arrangement 129 comprises an air-permeable tube 220 arranged to intercept flow of venting air from the elongate tube 124 to the air outlet 129a. This tube may conveniently be of a sintered ceramic material.

The embodiment of FIGS. 13 and 13a is similar in many respects to the embodiment of FIGS. 12 and 12a, and the same numerals are used in FIGS. 13 and 13a as in FIGS. 12 and 12a, except that they are increased by 10. It will be observed that whereas in the embodiment of FIGS. 12 and 12a the venturi is provided by having the cross-section of the interior of the tube 124 increasing only gradually, with the region of increasing cross-section extending all the way to the upstream end of the venting arrangement 129. In FIGS. 13 and 13a the venturi is provided by a shorter section of more rapidly increasing cross-section, which is succeeded by a tube portion 134a of constant cross-section.

Figure 2:
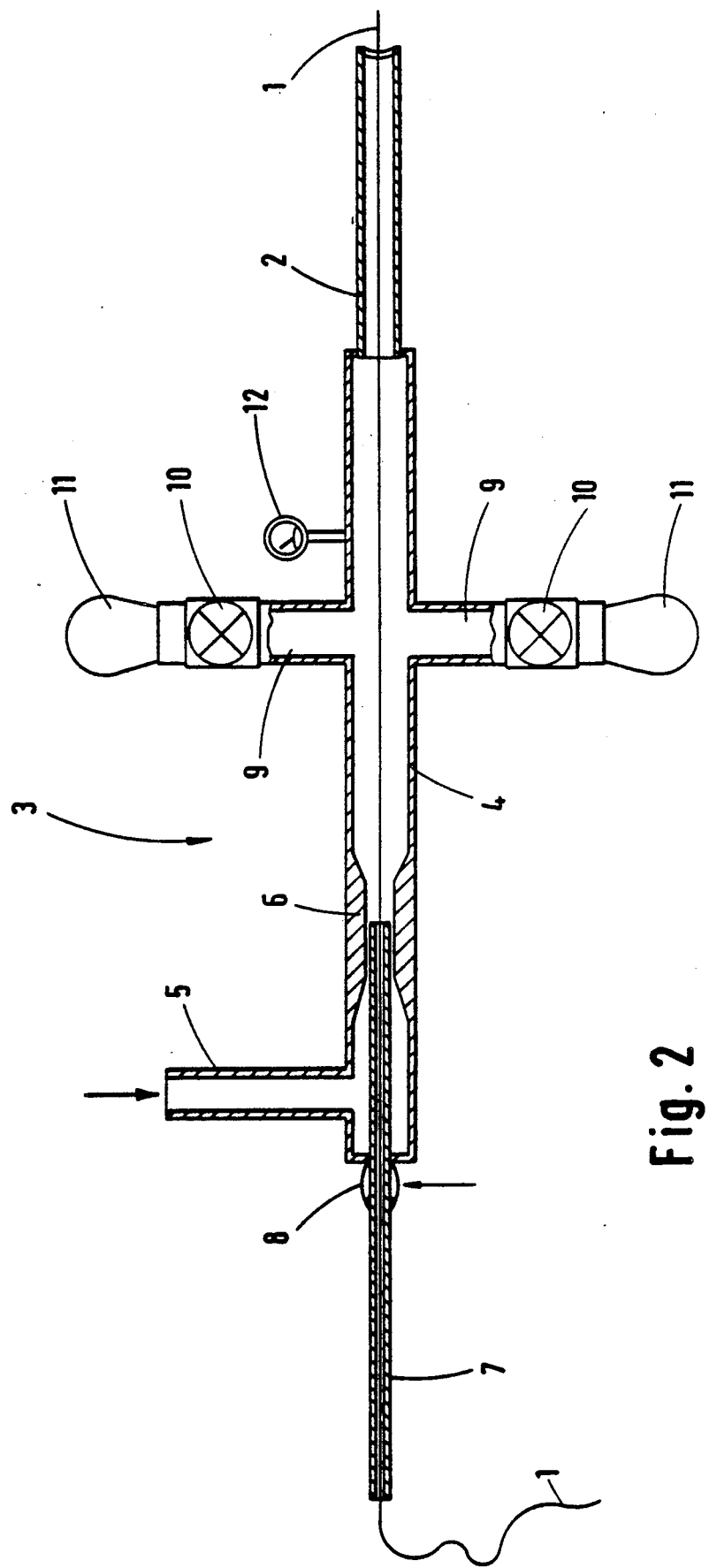
FIG. 2 is a diagrammatic plan view of the embodiment of FIG. 1.

One general comment which should be made in connection with the venting arrangements shown in FIGS. 3 to 7 and 11 to 13 is that in each of them the air outlet would be provided with a control valve corresponding in function to the value 10 shown in the embodiment of FIGS. 1 and 2.

One point which is to be noticed in connection with the venturis illustrated in the various embodiments is that they fall into three basic categories. The first category, represented by the embodiment of FIGS. 1 and 2 and the embodiment of FIG. 13, employs, as already indicated in relation to FIG. 13, a short tube section of rapidly increasing cross-section followed by a longer section of constant cross-section. Typically the first section has a half cone angle of about 20°. This design is especially suited to enabling the conditions under which the fibre member is launched into the tubular passageway to be adjusted, by varying the balance between energy transferred into the fibre member and pressure at the exit end of the hypodermic tube and at the upstream end of the passageway. The second category is represented by the embodiments of FIGS. 3 to 7 and 11 and 12, in which there is a comparatively long section of slowly increasing cross-section. Typically this section of increasing cross-section has a half-cone angle of about 3½°. This design is especially suited to maximum recovery of forward pressure at the upstream end of the passageway. The third category is represented by the embodiment of FIG. 8 in which the tip of the hypodermic tube tapers and the tube within which it is located is of constant cross-section. Typically the half cone angle of the tip of the hypodermic tube is about 20°. This design achieves similar characteristics to the first category. The third category is somewhat different to the structures generally known as venturis, but is to be regarded as a venturi for the purposes of the present invention.

The invention as described above has a number of advantages over the blowing technique of EP-A-108590 in addition to those already indicated, including the elimination of the need for moving parts and for an electrical power supply to the blowing head.

There is, of course, a limit to the length of fibre member which can be blown by the venturi apparatus described above. This limit will vary depending on the precise characteristics of the apparatus, of the fibre member being blown, and of the passageway into and along which it is being blown. For convenience of description let us suppose that the limit in particular circumstances is 1 km. If it is desired to blow a longer length of fibre member this can be achieved by having an appropriate number of venturi apparatuses spaced along the intended path of the fibre member at 1 km intervals. Thus, for example, to install a fibre member 5 km in length one would have five such apparatuses, one at the beginning and the other four spaced at 1 km intervals therefrom. Each of these other four would preferably be connected to the section of passageway upstream thereof via a connector vented to atmosphere, to ensure that the upstream end of each venturi was at atmospheric pressure.

Using the particular embodiments of apparatus described above, it will be appreciated that each of the apparatuses, apart from the first, will have the optical fibre member irremovably threaded through it once the fibre member is installed. In order to enable the apparatuses to be removed for reuse, therefore, they are therefore preferably constructed of two separable parts i.e. each is split along a longitudinally extending plane which passes through the region in which the fibre member travels. This makes it possible to remove the apparatuses from around the fibre member after the latter has been installed.

Although the invention has been described above particularly with reference to introducing a single optical fibre member, it is to be understood that it can also be used for introducing a plurality of such members into a given passageway, either simultaneously or successively.

I claim:

1. A method of providing an optical communications route by introducing at least one optical fibre member into a tubular passageway, which comprises passing a current of fluid into and through a venturi having at least a throat portion and a divergent portion connected thereto, the downstream side of said venturi communicating with said tubular passageway, introducing the optical fibre member into the venturi and thence into said tubular passageway, and wherein part of the fluid enters the tubular passageway and passes therealong to transport the optical fibre member, and the remainder of said fluid is vented downstream of said venturi and does not enter the tubular passageway.

2. A method according to claim 1, wherein the fluid is a gas.

3. A method according to claim 2, wherein the fluid is air.

4. A method according to claim 1, wherein the optical fibre member is introduced into the venturi from a region which is at a pressure above atmospheric.

5. The method of claim 1, in which said current of fluid passing through said venturi reaches sonic velocity.

6. An apparatus for introducing at least one optical fibre member into a tubular passageway, which comprising means defining a venturi having at least a throat portion and a divergent portion connected thereto, the downstream side of said venturi communicating, in use, with the tubular passageway, means for passing a current of fluid into and through the venturi, means for introducing the optical fibre member into the venturi and thence into the tubular passageway, and venting means positioned downstream of said venturi and upstream of the tubular passageway for venting a portion of the fluid downstream of said venturi to prevent entry of said portion of said fluid into the tubular passageway.

7. An apparatus as claimed in claim 6, wherein said introducing means comprises an introducing tube the upstream end of which communicates with a supply of at least an optical fibre member and the downstream end of which is situated within the means defining the venturi and spaced apart therefrom to define an annular gap.

8. An apparatus as claimed in claim 7, wherein means are provided for longitudinally adjusting the position of the introducing tube with respect to the venturi, whereby the location of the downstream end of the introducing tube within the venturi can be varied.

9. An apparatus as claimed in claim 8, wherein the cross-section of said annular gap varies along the length of the venturi.

10. An apparatus as claimed in claim 7 comprising means straightening the flow of the current of fluid passing into and through the venturi.

11. An apparatus as claimed in claim 10, wherein the flow straightening means comprises a fluid-permeable member disposed upstream of the venturi.

12. An apparatus as claimed in claim 10, wherein the flow straightening means comprises at least one longitudinally extending baffle disposed upstream of the venturi.

13. An apparatus as claimed in claim 7 wherein the means defining venturi comprises an elongate tube comprising a first portion whose internal cross-section increases as viewed in the direction of fluid flow and a second portion, downstream of the first portion, whose internal cross-section is substantially constant, the downstream end of the introducing tube being located within, or in the vicinity of, said first portion.

14. An apparatus as claimed in claim 7 wherein the means defining the venturi comprises an elongate tube comprising a portion whose internal cross-section slowly increases as viewed in the direction of fluid flow, the downstream end of the introducing tube being located at or adjacent the upstream end of the said portion.

15. An apparatus as claimed in claim 7, wherein the venturi is defined by an elongate tube, and a tapered tip portion of the introducing tube, the said tapered tip portion being located within said elongate tube.

16. An apparatus as claimed in claim 6, wherein the means defining the venturi and the said introducing means jointly comprise an integral member having a central longitudinal tube through which the optical fibre member passes and a plurality of longitudinal fluid-flow passages which extend generally parallel to the central longitudinal tube and which provide the venturi.

17. An apparatus as claimed in claim 16, comprising means for selectively blocking off some of the said fluid-flow passages.

18. An apparatus as claimed in claim 16, wherein the said fluid-flow passages are arranged symmetrically about the central longitudinal tube.

19. An apparatus as in claim 6, in which the velocity of the fluid is pre-selected to attain sonic velocity as it flows through said venturi.

20. An apparatus as claimed in claim 6, wherein the venting means comprises at least one vent tube.

21. An apparatus as claimed in claim 6, wherein the venting means comprises an annular chamber surrounding an upstream end portion of said tubular passageway, and at least one fluid outlet communicating with said annular chamber.

22. An apparatus as claimed in claim 21, wherein means are provided for permitting the said upstream end portion of the tubular passageway to move between a threading position in which its upstream end is close to the downstream end of said introducing means and an operating position in which it is further away from the downstream end of said introducing means.

23. An apparatus as claimed in claim 21, wherein the said annular chamber communicates with the said fluid outlet via a tortuous flow path.

24. An apparatus as claimed in claim 23, wherein the tortuous flow path is provided by an array of radially extending passageways communicating with the said annular chamber, and a further chamber communicating with the radially extending passageways and with the said fluid outlet.

25. An apparatus as claimed in claim 6, wherein the venting means comprises a fluid-permeable member arranged in the path of flow of the said fluid part so that said fluid part passes therethrough.

26. An apparatus as claimed in claim 25, wherein the fluid-permeable member is a tubular member so disposed that the interior thereof communicates with the downstream end of the venturi with the upstream end of the said tubular passageway, and the exterior thereof communicates with a fluid outlet.

27. An apparatus as claimed in claim 6 wherein the venting means is provided with a noise suppressing chamber.

* * * * *